(12) United States Patent
Hitomi

(10) Patent No.: US 6,848,642 B2
(45) Date of Patent: Feb. 1, 2005

(54) FISHING REEL BEARING AND COMPONENT SUPPORT STRUCTURE

(75) Inventor: Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 38 days.

(21) Appl. No.: 10/333,204

(22) PCT Filed: Sep. 13, 2001

(86) PCT No.: PCT/JP01/07972

§ 371 (c)(1),
(2), (4) Date: Jan. 17, 2003

(87) PCT Pub. No.: WO02/28177

PCT Pub. Date: Apr. 11, 2002

(65) Prior Publication Data

US 2003/0111569 A1 Jun. 19, 2003

(30) Foreign Application Priority Data

Sep. 29, 2000 (JP) .......................................... 2000-300369

(51) Int. Cl.[7] .............................................. A01K 89/01
(52) U.S. Cl. ...................................... 242/321; 242/319
(58) Field of Search ................................ 242/321, 319, 242/249, 257

(56) References Cited

U.S. PATENT DOCUMENTS

| 3,966,140 | A | * | 6/1976 | Coquelet et al. ............ 242/271 |
| 5,160,099 | A | | 11/1992 | Furomoto |
| 5,716,147 | A | * | 2/1998 | Cook et al. .................. 384/492 |
| 5,851,313 | A | * | 12/1998 | Milam ........................ 148/222 |
| 6,045,075 | A | | 4/2000 | Iwabuchi et al. |
| 6,102,315 | A | * | 8/2000 | Sato ............................ 242/249 |
| 6,176,446 | B1 | * | 1/2001 | Sato ............................ 242/319 |
| 6,270,028 | B1 | * | 8/2001 | Kim et al. .................. 242/262 |
| 6,286,772 | B1 | * | 9/2001 | Koelewyn .................... 242/246 |
| 6,318,898 | B1 | * | 11/2001 | Ward et al. .................. 384/492 |
| 6,412,720 | B1 | * | 7/2002 | Ikuta ........................... 242/269 |
| 6,457,662 | B1 | * | 10/2002 | Sato ............................ 242/247 |
| 6,575,392 | B1 | * | 6/2003 | Hong .......................... 242/319 |
| 6,581,939 | B1 | * | 6/2003 | Theros et al. ................ 277/394 |
| 6,598,818 | B2 | * | 7/2003 | Tsutsumi ..................... 242/263 |
| 6,637,690 | B2 | * | 10/2003 | Matsuda ..................... 242/231 |

FOREIGN PATENT DOCUMENTS

| JP | 7-133827 A | | 5/1995 | |
| JP | 02001131712 A | * | 5/2001 | ................. 242/321 |

* cited by examiner

Primary Examiner—Emmanuel Marcelo
(74) Attorney, Agent, or Firm—Shinjyu Global IP Couselors, LLP

(57) ABSTRACT

Fishing reel bearings curtail deterioration in rotational performance, and improve anti-corrosiveness, as well as make it easier to wash the bearings without incurring internal component corrosion. Dual-bearing reel bearing—a bearing provided between a boss, and a spool shaft disposed to the circumferentially inner side of, and rotational relative to, the boss—is furnished with an outer race, an inner race, and a plurality of rolling bodies. The outer race is fitted into the boss. The inner race is fitted in the spool, disposed parted at a clearance from the outer race. Between the two races, the rolling bodies of the plurality are disposed, circumferentially spaced and contacting both the races. The outer race, the inner race, and the rolling bodies are SUS 440C manufactures coated with a highly corrosion-resistant film.

21 Claims, 12 Drawing Sheets

FISHING REEL BEARING AND COMPONENT SUPPORT STRUCTURE

This is a National phase application based on the International Application PCT/JP01/07972, which was filed on Sep. 31, 2001 and published in English on Apr. 11, 2002.

TECHNICAL FIELD

The present invention relates to bearings and component support structures; in particular to fishing reel bearings and component support structures that are provided between a first component and second component disposed to the circumferentially inner side of and rotational relative to the first component, in fishing reels such as spinning reels and dual-bearing reels.

BACKGROUND ART

Numerous rotary components, such as rotors, spools and handle shafts, that rotate relative to the reel body or against other components are employed in fishing reels such as spinning reels and dual-bearing reels. Support on bearings lets rotary components of this sort rotate in the reel body or against other components. Ball bearings are often used in fishing reels as the bearings that support these rotary components.

Because fishing reels are generally used in an atmosphere in which moisture clings to and is liable to corrode ball bearings, improving their resistance to corrosion is desirable. Rust-withstanding stainless steels have been used conventionally to improve the corrosion resistance of ball bearings, especially as the material for ball bearings employed in fishing reels used for ocean fishing.

Taking rotational performance and cost into consideration, among the stainless steels, grade SUS440C (JIS), which can be hardened, is often employed for the rolling bodies in ball bearings. That is, SUS 440C sustains high rotational performance because it is sufficiently high-strength and impact-resistant for bearing applications, and maintains high machining precision. Nevertheless, a problem with SUS440C is that, compared to austenites such as grade SUS304 and SUS316 among carbon steels, though it is harder its corrosion resistance is lower. Therefore, if SUS 440C is to be employed for the rolling bodies in a ball bearing, the bearing as a unit should have a water-resistant structure in order to prevent corrosion. To lend the bearing a water-resistant structure, rubber-seal type ball bearings in which a sealing element made of rubber is fitted in between the inner and outer races, contacting both, are often used. The sealing element in rubber-seal type ball bearings is fitted at least on the ball-bearing side where liquids invade.

Preventing corrosion with a sealed bearing will mean that the sealing element contacting the inner/outer races places a higher rotational load on the bearing, which degrades rotational performance. To sustain rotational performance a non-contact sealing element could be employed, but sealing performance is poor with bearings having non-contacting sealing elements, and in fishing reels for ocean fishing in particular, corrosion resistance is not sufficient.

Meanwhile, disposing the seal element on the side of the bearings where the reel is subject to invasion by liquids is effective for preventing corrosion. Nevertheless dousing the reel with water from a hose to wash it after having ocean fished, for example, will not rinse the bearings, since water will not permeate to the bearing. Of course, rinsing the bearings is possible if the seal is not provided, but that risks corrosion and caustic erosion of the reel interior components arising when the washing water forces inside the reel salt deposits remnant on the exterior.

DISCLOSURE OF THE INVENTION

An issue for the present invention is in curtailing deterioration in rotational performance and improving bearing anti-corrosiveness.

A separate issue for the present invention is in making it easier to wash the bearings without incurring internal component corrosion.

A fishing-reel bearing in terms of the first invention is a fishing-reel bearing provided between a first component and a second component, disposed to the circumferentially inner side of and rotational relative to the first component, in a fishing-reel, and is furnished with an outer race, and inner race, and a plurality of rolling bodies. The outer race is fitted to the first component. The inner race is fitted to the second component and is disposed parted at a clearance from the outer race. Between the two races, the rolling bodies of the plurality are disposed, circumferentially spaced and contacting both the races. At least the rolling bodies, among the inner race, the outer race and the rolling bodies, are manufactured from a highly corrosion-resistant ingredient, or are metal manufactures coated with a highly corrosion-resistant coating film.

When either of the two components rotates relative to the other, either the inner race or the outer race rotates relative to the other, and the rolling bodies, riding on both the rollers, is roll spaced apart while gyrating and orbiting. Herein, the fact that at least the rolling bodies are manufactured with a highly anti-corrosive ingredient or else are metal manufactures coated with a highly anti-corrosive coating film means that the anti-corrosiveness of the rolling bodies—ever-rolling during rotation—is heightened. The corrosion resistance of the bearing overall is therefore improved. Further, because the anti-corrosiveness is improved, there is no need to provide a sealing element(s) for preventing corrosion. Eliminating need for a load-imposing seal while nonetheless improving anti-corrosiveness curtails deterioration in bearing rotational performance.

A fishing-reel bearing in terms of the second invention is the bearing set forth in the first invention, further furnished with a retainer, for retaining the rolling bodies circumferentially spaced while letting them roll, manufactured from a highly corrosion-resistant ingredient, or manufactured of a metal material coated with a highly corrosion-resistant coating film. In this case, the fact that the retainer contacting the rolling bodies is highly anti-corrosive means that there will not be retainer corrosion to interfere with the rolling of the rolling bodies.

A fishing-reel bearing in terms of the third invention is the bearing set forth in the first or second invention, wherein at least the rolling bodies are ceramic manufactures. In this case, the corrosion resistance of at least the rolling bodies, owing to the non-corroding ceramic, is the more highly maintained.

A fishing-reel bearing in terms of the fourth invention is the bearing set forth in the first or second invention, wherein at least the rolling bodies are stainless alloy manufactures coated with a highly corrosion-resistant coating film. In this case, corrosion is made less likely, even if the highly corrosion-resistant coating film were to peel off.

A fishing-reel bearing in terms of the fifth invention is the bearing set forth in the fourth invention, wherein the highly corrosion-resistant coating film is formed upon refining the stainless alloy surface. In this case, the fact that the highly corrosion-resistant coating film is formed after processing the surface of the stainless alloy to refine it means that, compared with plating or coating processes, the highly corrosion-resistant coating film is not liable to peel off. Again, carrying out a plating or coating process risks that, depending on the accuracy of the process, afterwards the parent material will be out of round (its sphericity will be spoiled) but how true the parent material is (its sphericity) is less likely to be harmed by the refining process.

A fishing-reel bearing in terms of the sixth invention is the bearing set forth in the fifth invention, wherein at least the rolling bodies are low corrosion-resistant-ingredient SUS 440C manufactures. In this case, the corrosion resistance of the parent material is inferior, but the parent material strength is high, which lengthens the life span of the bearing.

A fishing-reel component support structure in terms of the seventh invention is a structure for supporting in a fishing reel, and letting rotate relative to each other, a first component and a second component, and is furnished with a bearing and a sealing member. The bearing is any set forth in inventions one through six, disposed in a position within the reel in which liquids from the exterior can invade. The sealing member is disposed to the side opposite the side where liquid invades through the bearing, and is a member that seals the clearance between the two components. In this case, though seawater invades the bearing it is not liable to corrode, and at the same time rinse water or the like can permeate the bearing, which facilitates washing a sea-water soiled bearing. Moreover, because the sealing member is fitted on the inward side of the bearing, liquids will not invade deeper than that, which prevents corrosion of the interior components.

A fishing-reel component support structure in terms of the eighth invention is a structure for supporting in a fishing reel, and letting rotate relative to each other, a first component and a second component, and is furnished with a bearing and a sealing member. The bearing is any set forth in inventions one through six, disposed in a position within the reel in which liquids from the exterior can invade. The sealing member is disposed to the opposite side of the rolling bodies from the liquid-invasion side, and is a member that seals the clearance between the two races. In this case, though seawater invades the bearing it is not liable to corrode, and at the same time rinse water or the like can permeate the bearing, which facilitates washing a sea-water soiled bearing. Moreover, because the sealing member is fitted on the inward side of the rolling bodies, liquids will not invade deeper than that, which prevents corrosion of the interior components.

PREFERRED EMBODIMENTS OF THE PRESENT INVENTION

First Embodiment

Figure 1:
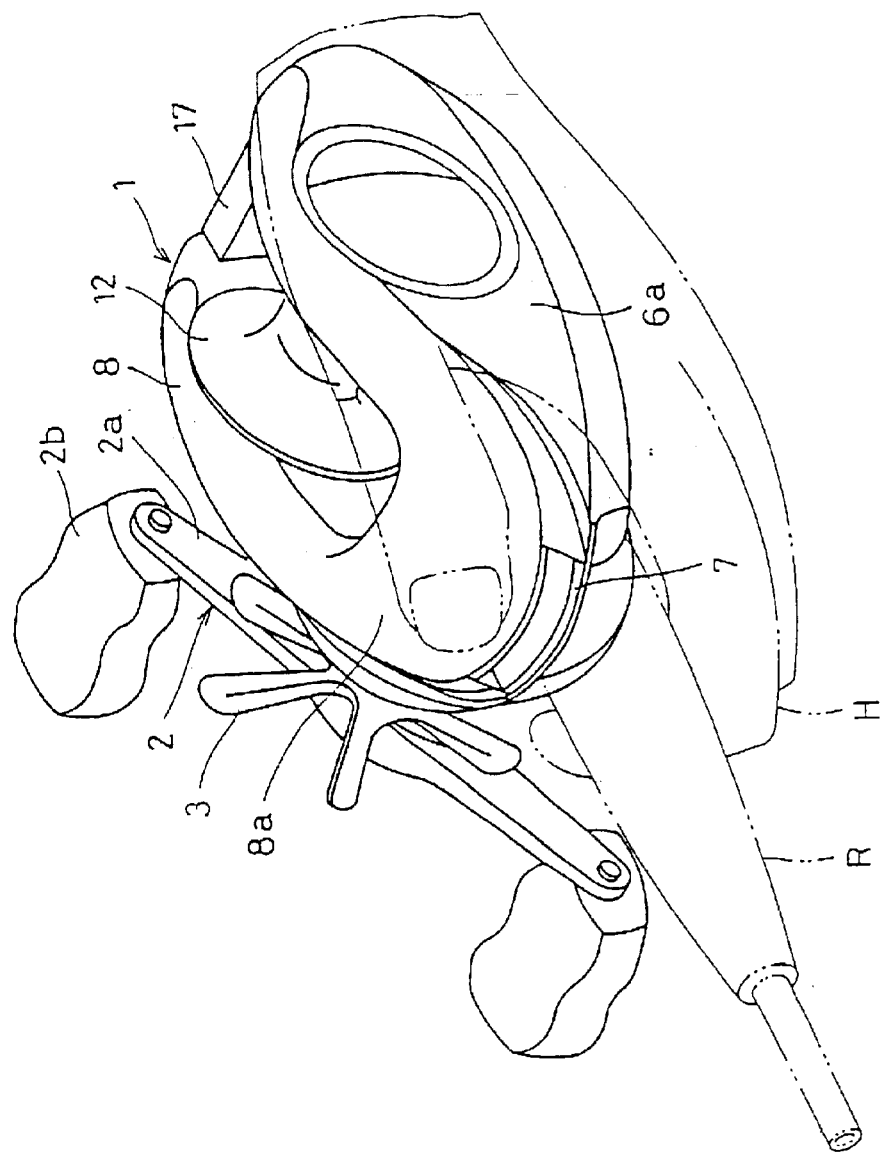
FIG. 1 is an oblique view of a dual-bearing reel in which a first embodiment of the present invention is adapted, with a user's hand, and a rod on which the reel is mounted, shown in phantom.
Figure 2:
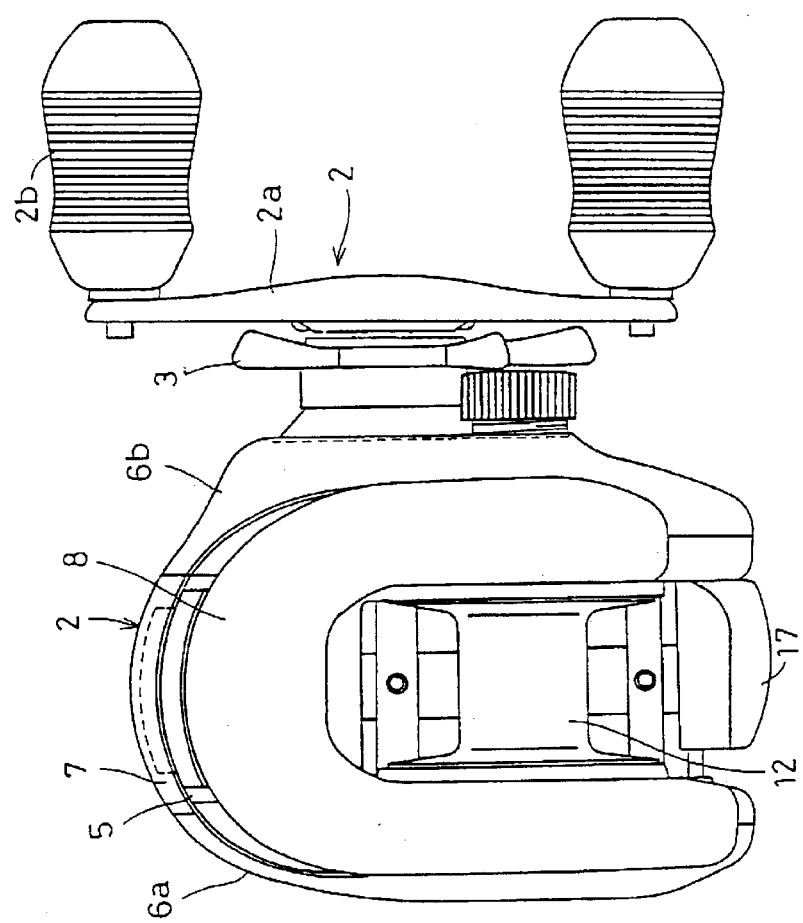
FIG. 2 is an overhead view of the FIG. 1 reel.

The dual-bearing reel, in which one embodiment of the present invention is adapted, set out in FIG. 1 and FIG. 2, is a baitcasting, low-profile type reel. The reel is furnished with: a reel body 1; a spool-cranking handle 2 disposed sideways on the reel body 1; and a line-winding spool 12 fitted rotatably and detachably/reattachably to the reel body 1 interior. A star drag 3 for adjusting drag tension on the spool 12 is provided on the handle 2 side of the reel body 1.

Figure 3:
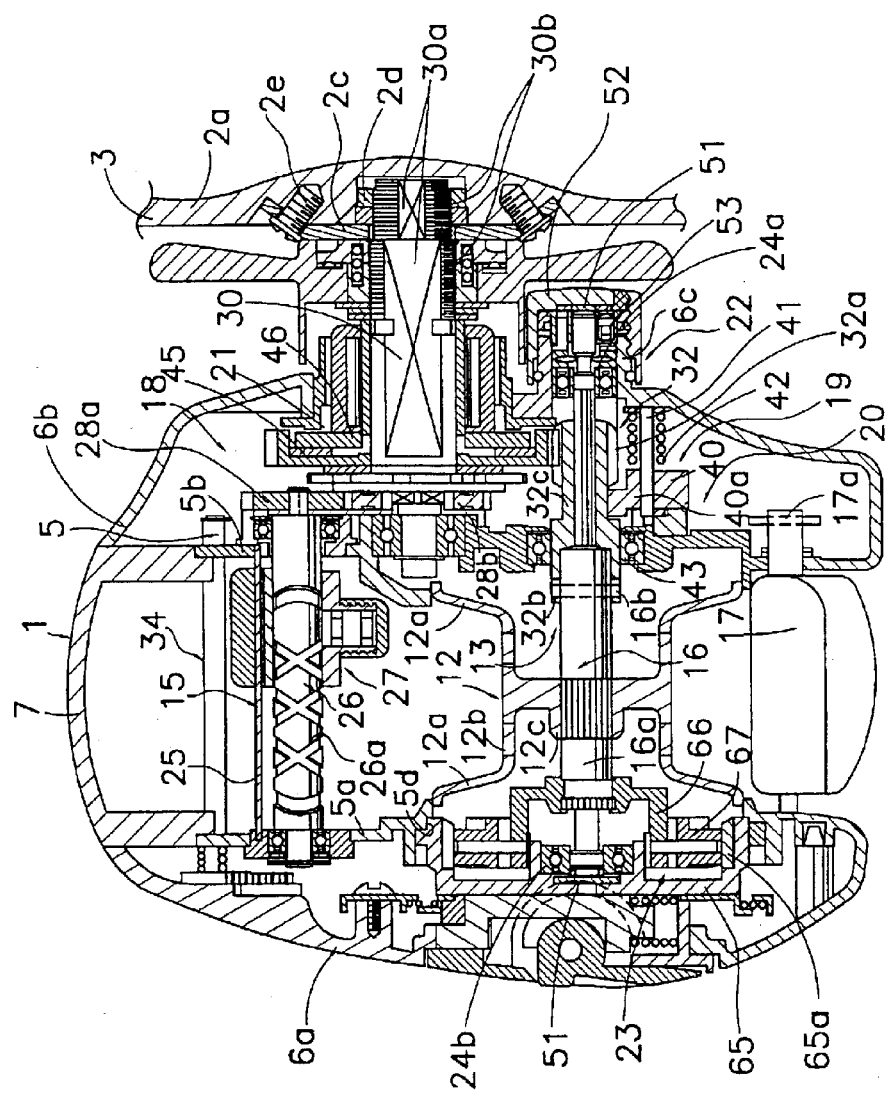
FIG. 3 is a horizontal section view through the FIG. 2 depiction of the reel, with the handle fragmentary.

The handle 2 is in the form of a double handle having a plate-shaped handle arm 2a and grips 2b fitted free to rotate on either end of the handle arm 2a. The handle arm 2a, as shown in FIG. 3, is fixed by two screws 2e to a washer 2c, which is itself fixed non-rotatably to the tip of a handle shaft 30 by a nut 2d. The nut 2d is housed in and stopped against turning by the interior of the handle arm 2a. This configuration leaves the outside face of the handle arm 2a a smooth surface absent of joint seams, meaning that the handle arm 2a structure is not liable to entangle fishing line.

As shown in FIG. 3, the reel body 1 includes a frame 5, and fitted on either side of the frame 5a, first cover 6a and a second cover 6b. The reel body 1 further includes, as shown in FIG. 1 and FIG. 2, an anterior cover 7 covering the front, and a thumb rest 8 covering the upper part.

The frame 5 includes, as shown in FIG. 3, a pair of side plates 5a, 5b disposed to oppose mutually parted by a predetermined spacing, and a plurality of connectors 5c (see FIG. 5) that connect these side plates 5a, 5b. A mounting leg 4, made of a metal such as, e.g., stainless alloy and extending front to rear for mounting the reel to a fishing rod R, as indicated in FIG. 4 and 5, are screwed fast to the underside two connectors 5c.

To enable the spool 12 to be attached/removed, the first side cover 6a is pivotally attached to the frame 5, whereby it can be opened off and shut onto the frame 5. The second side cover 6b is screwed fast to the frame 5.

Figure 4:
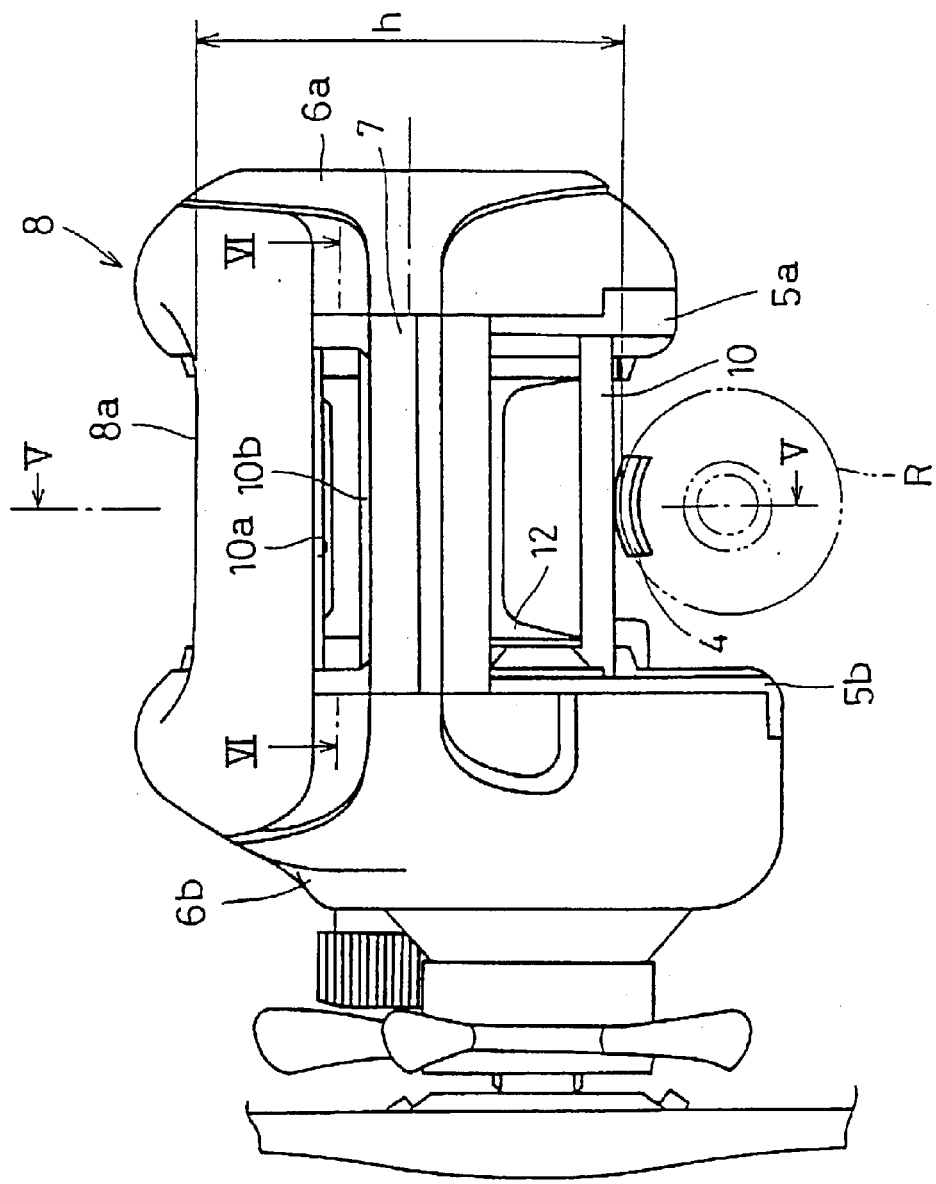
FIG. 4 is a front elevation view of the FIG. 1 reel, with the handle fragmentary.
Figure 5:
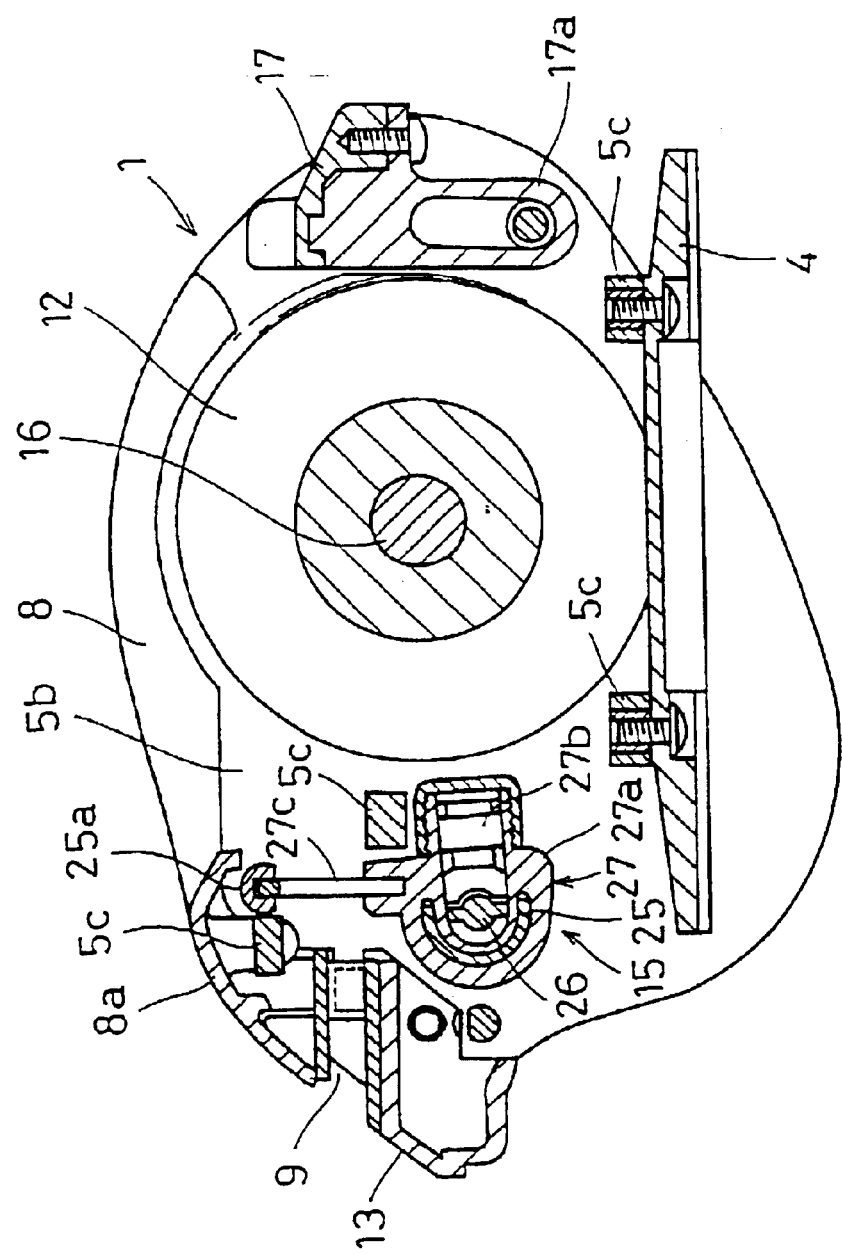
FIG. 5 is a section view taken through V—V in FIG. 4, and seen in the direction of the arrows.

The anterior cover 7, as shown in FIG. 4 and FIG. 5, is set in the front part of the reel body 1, attached between the side plates 5a, 5b. An aperture 9 is formed in the front of the anterior cover 7 between it and the thumb rest 8 disposed above. The aperture 9 is formed lengthened widthwise to enable fishing line to pass through. The fact that guide ring 27c is not, however, disposed facing on the aperture 9 as is conventional in dual-bearing reels, means that the vertical height is narrower. Upper and lower cover members 10a, 10b, made of a ceramic smooth-faced with a hardener such as, e.g., silicon nitride or zirconia, are respectively fitted to the upper/lower aspects of the inner peripheral surface of the aperture 9, i.e., the frontward bottom of the thumb rest 8 and the upper surface of the anterior cover 7. The cover members 10a, 10b are provided so that the aperture 9 will not be damaged when fishing line is contacting the vertically narrow aperture 9, and at the same time to make the resistance acting on the contacting fishing line smaller. Bolts fix the cover members 10a, 10b respectively to the thumb rest 8 and the anterior cover 7.

The thumb rest 8 is attached to the reel body 1, as shown in FIG. 1, FIG. 2 and FIG. 4, in a C-shape regarded from a planar aspect. Palming the reel spool is done with the thumb of the hand H (see FIG. 1) that holds the fishing rod put on the front part 8a of the thumb rest 8. The upper face of the thumb rest 8 is configured with respective curved surfaces bending convexly upward. The height v of the thumb rest 8 front part 8a from the mounting leg 4 (see FIG. 4) is lower than in conventional dual-bearing reels.

Arranged within the frame 5 are, as shown in FIG. 3: a spool 12, disposed in a direction orthogonal to the fishing rod R; a level-wind mechanism 15 for winding fishing line uniformly into the spool; and a clutch lever 17 that serves as a seat for the thumb when feathering. Further, arranged in between the frame 5 and the second side cover 6b are: a gear train 18 for transmitting torque from the handle 2 to the spool 12 and the level wind mechanism 15; a clutch device 13; a clutch connect/disconnect mechanism 19 for engaging/disengaging the clutch device 13; a connect/disconnect control mechanism 20 for controlling engaging/disengaging of the clutch device 13 in response to operation of the clutch lever 17; a drag mechanism 21; and a casting control mechanism 22 for adjusting resistive force on the spool 12 when it rotates. A centrifugal braking mechanism 23 for curtailing backlash during casting is disposed, again, in between the frame 5 and the second side cover 6b. In this embodiment, the reel body 1 is a stationary component, while the spool 12 and the gear train 18 are rotative components.

The spool has a saucer-shaped flange 12a on both ends, and includes a tubular bobbin trunk 12b in between the two flanges 12a. The spool 12 further includes a tubular boss 12c, formed unitarily on the inner circumferential side of the bobbin trunk 12b in essentially the mid-portion axially; and a spool shaft 16 penetrates and is fastened non-rotatably, by e.g. a serrated coupling, to the boss 12c. This fastening method is not limited to a serrated coupling; various coupling methods such as key-coupling or spline-coupling can be employed.

Figure 6:
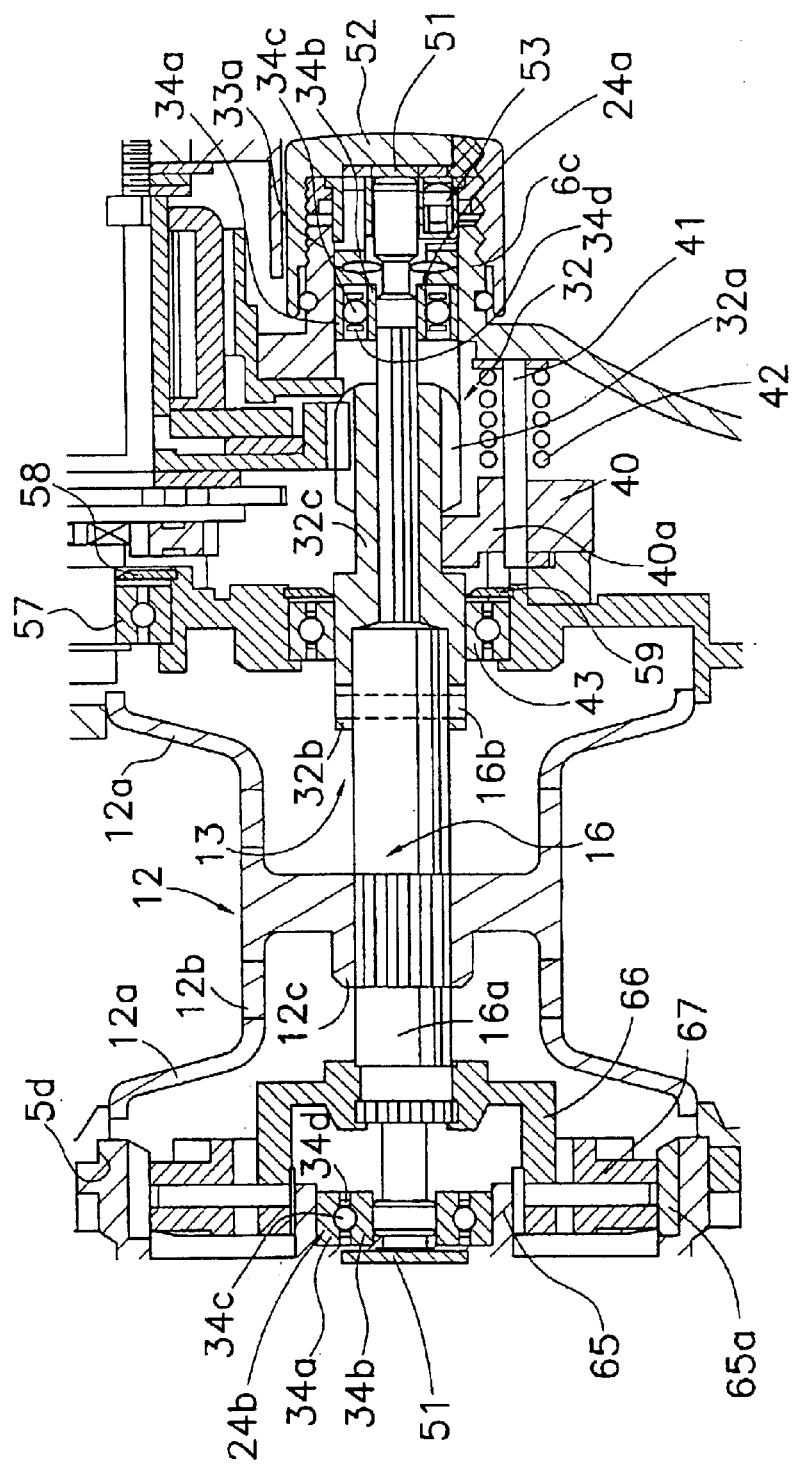
FIG. 6 is a fragmentary view enlarged from FIG. 3 to show details of components associated with the spool shaft.

The spool shaft 16, as shown in FIG. 6, penetrates the side plate 5b to extend outward from the second side cover 6b. A ball bearing 24a in a boss 6c supports the extending end while leaving it to rotate. Further, a ball bearing 24b within the centrifugal braking mechanism 23 supports the other end of the spool shaft 16 while leaving it to rotate. The ball bearings 24a, 24b include respective outer races 34a, inner races 34b, pluralities of rolling bodies 34c and retainers 34d. The outer race 34a of the ball bearing 24a is fitted in a boss (one example of a first component) 6c, and its inner race 34b is fitted onto the spool shaft (one example of a second component) 16. The outer race 34a of the ball bearing 24b is fitted in a brake case (one example of a first component) 65, and its inner race 34b is fitted onto the spool shaft (one example of a second component) 16. The rolling bodies 34c are steel balls, disposed circumferentially spaced and riding on the outer races 34a and inner races 34b at once. The retainers 34d retain the rolling bodies 34c circumferentially spaced while letting them roll. The outer races 34a, inner races 34b and rolling bodies 34c are manufactured, for example, from SUS 440C that is of ingredients from a family of low corrosion-resistant metals. A highly corrosion-resistant coating film is left formed on their stainless steel surfaces by a surface-refining process serving to stabilize and strengthen a coating film created by forming a film of highly corrosion resistant concentrated chromium oxide coating the surfaces. Accordingly, the rolling bodies 34c have surfaces that are highly corrosion-resistant. The retainers 34d are manufactured from a synthetic resin having high corrosion resistance, such as nylon, for example. Using SUS 440C the retainers 34d also may be made covered in a highly corrosion resistant coating film.

Disposed in the portion of the side plate 5b the spool shaft 16 penetrates is the right end of its larger-diameter portion 16a, to which is fixed an engagement pin 16b that is a constituent of the clutch device 13. The engagement pin 16b penetrates the lager-diameter portion 16a along a diameter thereof, with either end jutting out diametrically.

The level wind mechanism 15, as shown in FIG. 3, includes: a guide tube 25, fixed in between the pair of side plates 5a, 5b; a worm shaft 26 rotatably supported within the guide tube 25; and a line guide 27. In this embodiment, the worm shaft 26 is also a rotative component.

The guide tube 25-a round tubular component the rear circumferential surface of which is cut out spanning its entire length-guides the line guide 27 in the axial direction of the spool shaft 16 (direction orthogonal to the fishing rod R).

Figure 7:
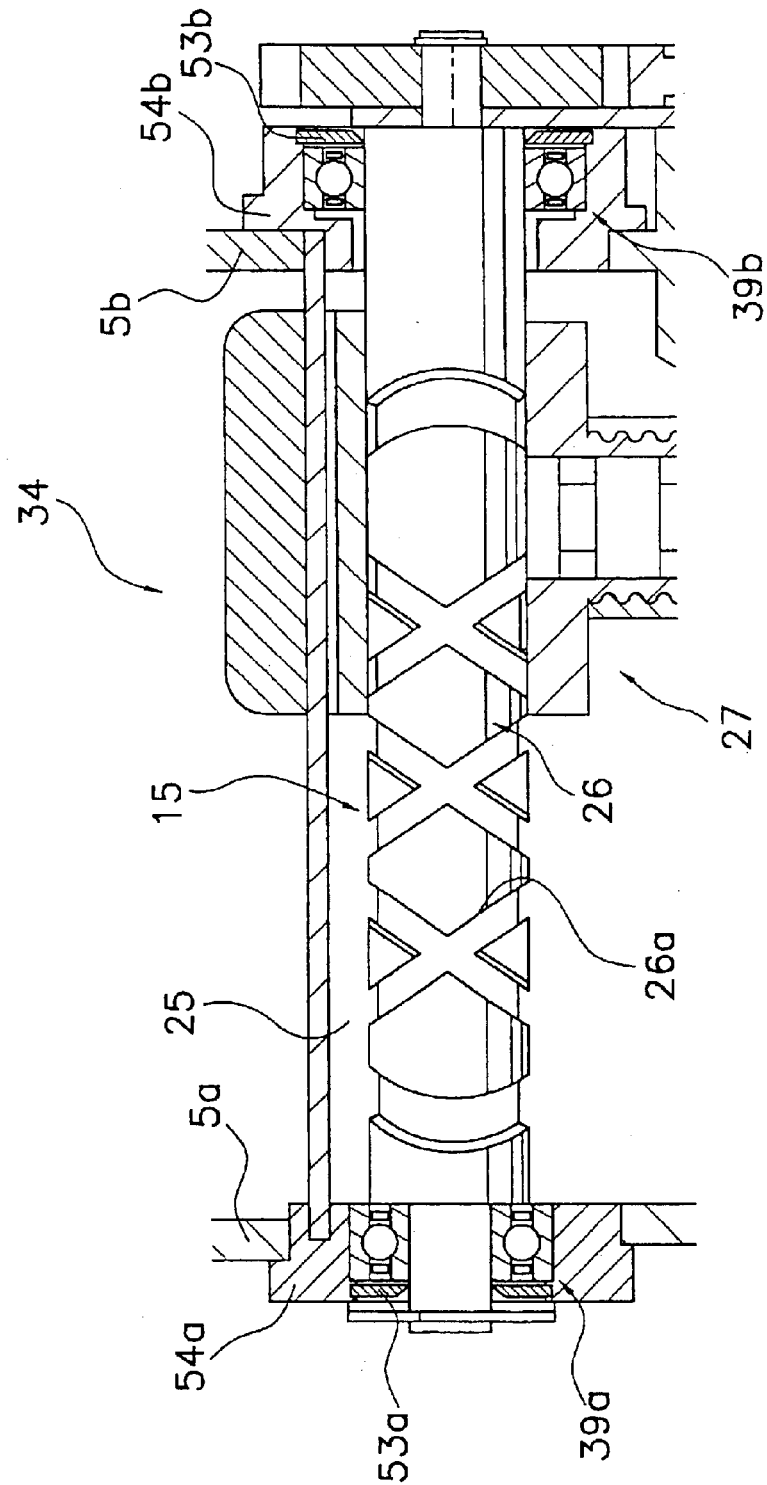
FIG. 7 is a fragmentary view enlarged from FIG. 3 to show details of components associated with the worm shaft.

The worm shaft 26, as shown in FIG. 7, is a rod for shuttling the line guide 27 in the axial direction of the spool shaft 16. Ball bearings 39a, 39b in bosses 54a, 54b provided in the side plates 5a, 5b rotatively carry either end of the worm shaft 26. These ball bearings are like the above noted ball bearings 24a, 24b in configuration, and have high corrosion resistance. Outward of the ball bearings 39a, 39b, i.e., on the sides opposite the inner sides in the liquid-invading direction, rubber-made sealing members 53a, 53b are fitted respectively into the bosses 54a, 54b. The sealing members 53a, 53b prevent liquids invading through the ball bearings 39a, 39b from the inside faces of the side plates 5a, 5b from permeating more than that into the interior of the reel body 1. Fitting the sealing members 53a, 53b in this way means that though the bearings 39a, 39b are washed by dousing with fresh water, the water will not invade the reel body 1 interior. A gear 28a that is a component of the gear train 18 is fixed to the end of the worm shaft 26. Further, a groove 26a of an intersecting spiral contour is formed in the worm shaft 26.

The line guide 27, as shown in FIG. 5, includes: a guide body 27a; an interlocking pin 27b fitted free to rotate in the guide body 27a; and a guide ring 27c disposed projecting upward on top of the guide body 27a. A U-shaped through-hole that the guide tube 25 penetrates is formed in the guide body 27a, parallel with the spool shaft 16; the guide body 27a is supported while left to shift axially on the guide tube 25. The interlocking pin 27b is disposed running roughly front-to-rear on the hind portion of the guide body 27a, and its tip interlocks with the groove 26a on the worm shaft 26. Under rotation of the worm shaft 26, the interlocking pin 27b rotates along the groove 26a, shuttling the guide body 27a. The guide ring 27c is formed by bending a wire made of, e.g., a stainless alloy into hairpin shape with a convex top, forming an elongate hole on the inner peripheral side. The guide ring 27c is fixed into the guide body 27a with its rear end planted into the upper face on the hind portion thereof. The surface of the guide ring 27c is coated with, e.g., a metal such as titanium nitride, or with a ceramic such as SiC; making the surface smooth and hard. Now, the guide rings 27c is disposed in between the aperture 9 and the spool 12, adjacent the spool 12. The upper portion of the guide ring 27c is guided parallel to the spool shaft 16 by a guide rod 25a in the lower portion of which a guide groove is formed. The guide rod 25a is disposed above the guide tube 25, and parallel with the guide tube 25, and its two ends are fixed to the side plates 5a, 5b. Thus arranging a guide ring 27c tall in standing height adjacent the spool 12, lowers the height H of the front part 8a of the thumb rest 8, which facilitates palming.

Within the level wind mechanism 15, rotating the worm shaft 26 via the gear train 18 shuttles the line guide 27 along the guide tube 25. By inserting fishing line through the guide ring 27c on the line guide 27, the fishing line is wound uniformly onto the spool 12.

The gear train 18 includes: the handle shaft 30; a main gear 31 fixed to the handle shaft 30; a tubular pinion gear 32 that meshes with the main gear 31; a gear 28a fixed to the end of the earlier described worm shaft 26; and a gear 28b that is fixed non-rotatably to the handle shaft 30, and that meshes with the gear 28a. Because the height of the thumb rest 8 is lower, the vertical position of the handle shaft 30 in gear train 18 is in a lower than conventional position. Therefore, the bottom portion of the side plate 5b and second side cover 6b, which house the gear train 18, is positioned lower than the bottom of the side plate 5a and the first side cover 6a. The tip of the handle shaft 30 is reduced in diameter, and a parallel chamfered portion 30a and a male-threaded portion 30b are formed respectively on the larger diameter portion and the smaller diameter portion of the tip.

A ball bearing 57 in the side plate 5a supports the base end of the handle shaft 30 (FIG. 3 left end). The ball bearing 57 has, likewise as in the foregoing, high corrosion resistance. A sealing member 58 is disposed on the FIG. -6 right side of the ball bearing 57. This sealing member 58 is like the sealing members 53a, 53b in configuration, meaning that though the ball bearing 57 is washed with fresh water, the fresh water is not liable to invade the interior.

The pinion gear 32 as shown in FIG. 6 extends inward from the outside the side plate 5b, and is a tubular component whose center the spool 16 penetrates and is allowed axial movement fitted to the spool shaft 16. Further, a bearing 43 in the side plate 5b rotatively carries the FIG. -6 left end of the pinion gear 32 while allowing it axial movement. The ball bearing 43 in configuration is similar to the foregoing. A sealing member 59 is fitted on the FIG. -6 right side, i.e., the opposite side from the liquid-invasion side, of the ball bearing 43.

The pinion gear 32 has: a toothed portion 32a, formed on the FIG. -6 right end outer periphery, that tooths with the main gear 31; a meshing portion 32b formed on the other end; and a constriction 32c formed in between the toothed portion 32a and the meshing portion 32b. Formed along a diameter in the end face of the pinion gear 32 is notch, making up the meshing portion 32b, into which the engagement pin 16b penetrating and fixed to the spool shaft 16 is interlocked. Herein, when the pinion gear 32 is shifted outward, separating the meshing portion 32b and the engagement pin 16b on the spool shaft 16, torque from the handle 30 will not be transmitted to the spool 12. The meshing portion 32b and the engagement pin 16b compose the clutch device 13. Direct transmission of torque from the pinion gear 32—larger in diameter than the spool shaft 16—to the spool shaft 16, by engagement of the engagement pin 16b and the meshing portion 32b, lessens twisting deformation, and improves torque transmission efficiency.

The clutch lever 17, as shown in FIG. 2, is disposed in the rear between the pair of side plates 5a, 5b. Elongate holes (not illustrated) are formed in the side plates 5a, 5b on the frame 5, and a rotation shaft 17a for the clutch lever 17 is rotatively carried in the elongate holes. This enables the clutch lever 17 to slide up and down along the elongate holes.

The clutch connect/disconnect mechanism 19 has, as shown in FIG. 3, a clutch yoke 40. The clutch yoke 40 is disposed about the outer periphery of the spool shaft 16, and is carried, while left movable parallel to the center axis of the spool shaft 16, on two pins 41 (only that on one side is illustrated). Now, the spool shaft 16 is rotatable relative to the clutch yoke 40. That is, the clutch yoke 40 is made not to rotate even though the spool shaft 16 rotates. Further, in its central portion the clutch yoke 40 has an engaging portion 40a that engages with the constriction 32c in the pinion gear 32. Also, a spring 42 is disposed peripherally about each of the pins 41 carrying the clutch yoke 40, in between the clutch yoke 40 and the second side cover 6b. The clutch yoke 40 is constantly urged inward by the springs 42.

The configuration thus, in the ordinary state, in which the pinion gear 32 is located in the inward, clutch-engagement position, will be clutch-on by engagement of the meshing portion 32b and the engagement pin 16b on the spool shaft 16. On the other hand, when the pinion gear 32 is shifted outward by the clutch yoke 40, engagement of the meshing portion 32b and the engagement pin 16b comes undone, putting the clutch connect/disconnect mechanism 19 into clutch-off.

The drag mechanism 21 includes: the star drag 3 for a drag-tension adjusting operation; a friction plate 45 on which the main gear 31 presses; and a pressing plate 46 for pressing, under rotational working of the star drag 3, the friction plate 45 with predetermined force on the main gear 31. The star drag 3 is configured to issue sound when rotationally worked.

The casting control mechanism 22, as shown in FIG. 3, includes: a plurality of friction plates 51, disposed to straddle either end of the spool shaft 16; and a braking cap 52 for regulating the force with which the friction plates 51 grasp the spool shaft 16. The friction plates 51 on the right side are fitted within the braking cap 52; the friction plates 51 on the left side are fitted within the brake case 65. The braking cap 52 is configured to issue sound when rotationally worked.

The centrifugal braking mechanism 23, as shown in FIG. 3, includes: the brake case 65; a rotor 66 provided within the brake case 65; and sliders 67 disposed circumferentially spaced, and fitted free to shift diametrically, on the rotor 66. A tubular brake liner 65, with which the sliders 67 can come into contact, is fixed to the inner circumferential surface of the brake case 65. The brake case 65 is fitted to let it be attached to/removed from a round opening 5d formed in the side plate 5a, and pivots together with the first side cover 6a.

Next, the reel operating method will be explained.

In the ordinary state, the clutch yoke 40 is pushed inward (FIG. -3 leftward) by the springs 42, and the pinion gear 32 is thereby shifted into the engagement position. In this state, the meshing portion 32b of the pinion gear 32 and the engagement pin 16b on the spool shaft 16 mesh, making the state CLUTCH-ON; and torque from the handle 2 is transmitted to the spool 12 via the handle shaft 30, the main gear 31, the pinion gear 32, and the spool shaft 16, which rotates the spool 12 in the line-retrieving direction.

When casting, the braking force is adjusted in order to suppress backlash. Herein, adjusting the braking force to correspond to the mass of, for example, the lure (terminal tackle) is desirable. Specifically, if the mass of the lure is large, the braking force is set large, and if small is set small.

Adjustment of the braking force in order to suppress backlash is carried out with the casting control mechanism 22 or the centrifugal braking mechanism 23.

After the braking force is adjusted, the clutch lever 17 is pressed down. Herein, the clutch lever 17 shifts downward along the elongate holes in the side plates 5a, 5b into the separating position. Then, the movement of the clutch lever 17 shifts the clutch yoke 40 outward, which shifts in the same direction the pinion gear 32 engaged with the clutch yoke 40. Consequently, the engagement between the meshing portion 32b of the pinion gear 32 and the engagement pin 16b on the spool shaft 16 comes undone, making the state CLUTCH-OFF. In the CLUTCH-OFF state, rotation from the handle shaft 30 is transmitted to neither the spool 12 nor the spool shaft 16, leaving the spool 12 in a free-rotational state.

With the reel in the CLUTCH-OFF state, while feathering the spool 12 with the thumb placed on the clutch lever 17, tilting the reel in its axial direction so that the spool shaft 16 lies in a perpendicular plane, and flicking the fishing rod, casts the lure and rotates the spool 12 in the line reel-out direction.

In this state as such, the rotating spool 12 rotates the spool shaft 16 in the line reel-out direction, and the rotation is transmitted to the rotor 66. When the rotor 66 rotates the sliders 67 slide into contact with the brake liner 65a, and the spool shaft 12 is braked by the centrifugal braking mechanism 23. Simultaneously, the casting control mechanism 22 brakes the spool shaft 16, which prevents backlash.

When the terminal tackle lands in the water, the handle 2 is turned. A not-illustrated return mechanism thus puts the state to CLUTCH-ON. In this state, retrieving is repeated, for example, in waiting for a fish to strike. When a fish bites, the handle 2 is rotated to wind in the fishing line. In this situation, the need to adjust the drag force sometimes arises depending on the size of fish. In that case, the star drag 3 is turned clockwise or counterclockwise to adjust the drag force.

Herein, with regard to the ball bearings disposed in positions in which liquids from the exterior invade, because sealing members are disposed on their inner sides (the sides opposite the liquid-invasion sides), though the bearings are washed with fresh water, the rinsing liquid will not enter the reel body 1 interior, which prevents corrosion of the interior sections of the reel body 1. Further, that fact that corrosion-resisting capability of the bearings themselves is raised means that bearings are not liable to corrode. Further still, the fact that the corrosion resistance of the ball bearings 24a, 24b—which in carrying the spool 16 require special rotational performance—alone is improved without providing them with sealing members, curbs degradation in their rotational performance.

Second Embodiment

The present invention, which in the foregoing first embodiment was illustrated by giving an example in a dual-bearing reel as a fishing reel, is yet applicable to other fishing reels such as spinning reels.

Figure 8:
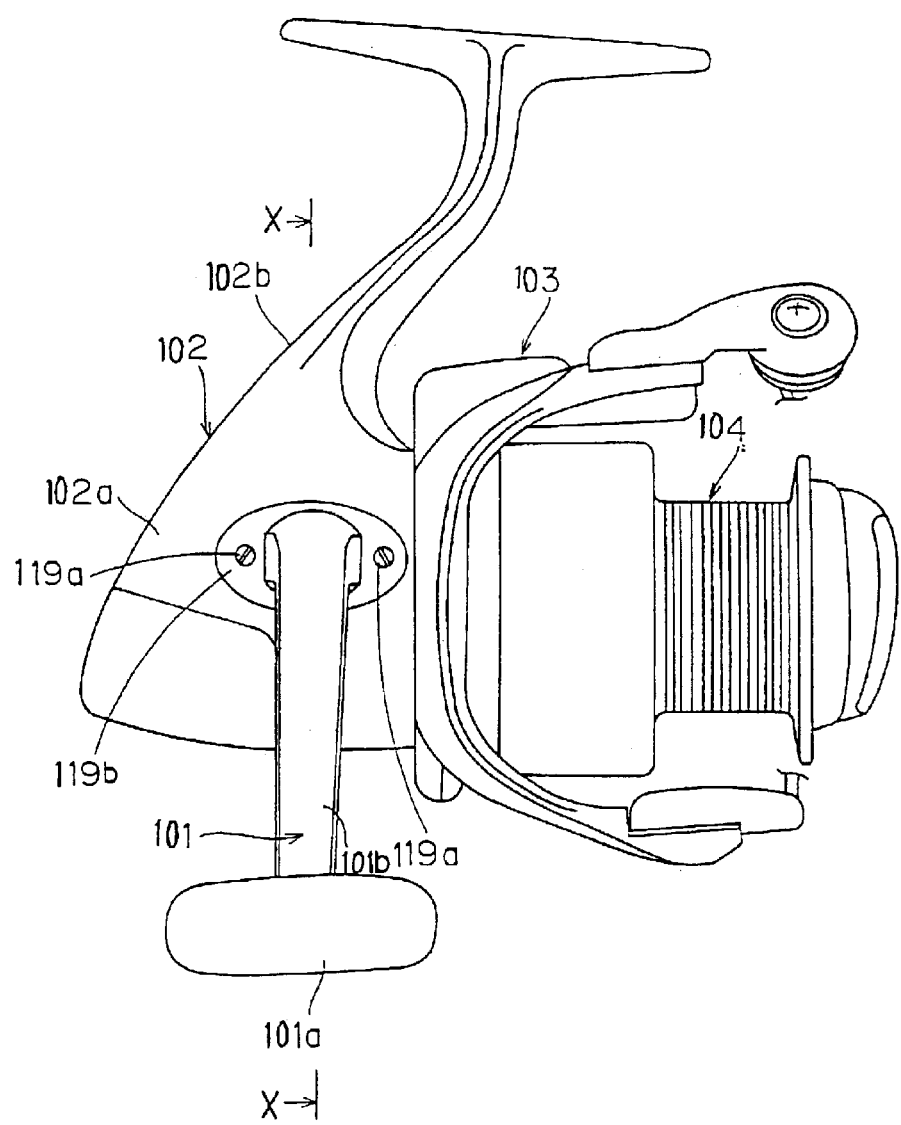
FIG. 8 is a lateral view of a spinning reel in which a second embodiment of the present invention is adapted, with the bail fragmentary.

Set out in FIG. 8, a spinning reel into which one embodiment of the present invention is adopted is furnished with a handle 101, a reel unit 102 rotatively carrying the handle 101, a rotor 103, and a spool 104. The rotor 103 is rotatively supported on the front of the reel unit 102. The spool 104, onto the circumferential surface of which fishing line is retrieved, is disposed on the front of the rotor 104 so as to be shiftable front and rear. In this embodiment, the reel unit 102 functions as a stationary component, while the rotor 103 functions as a rotative component.

Figure 9:
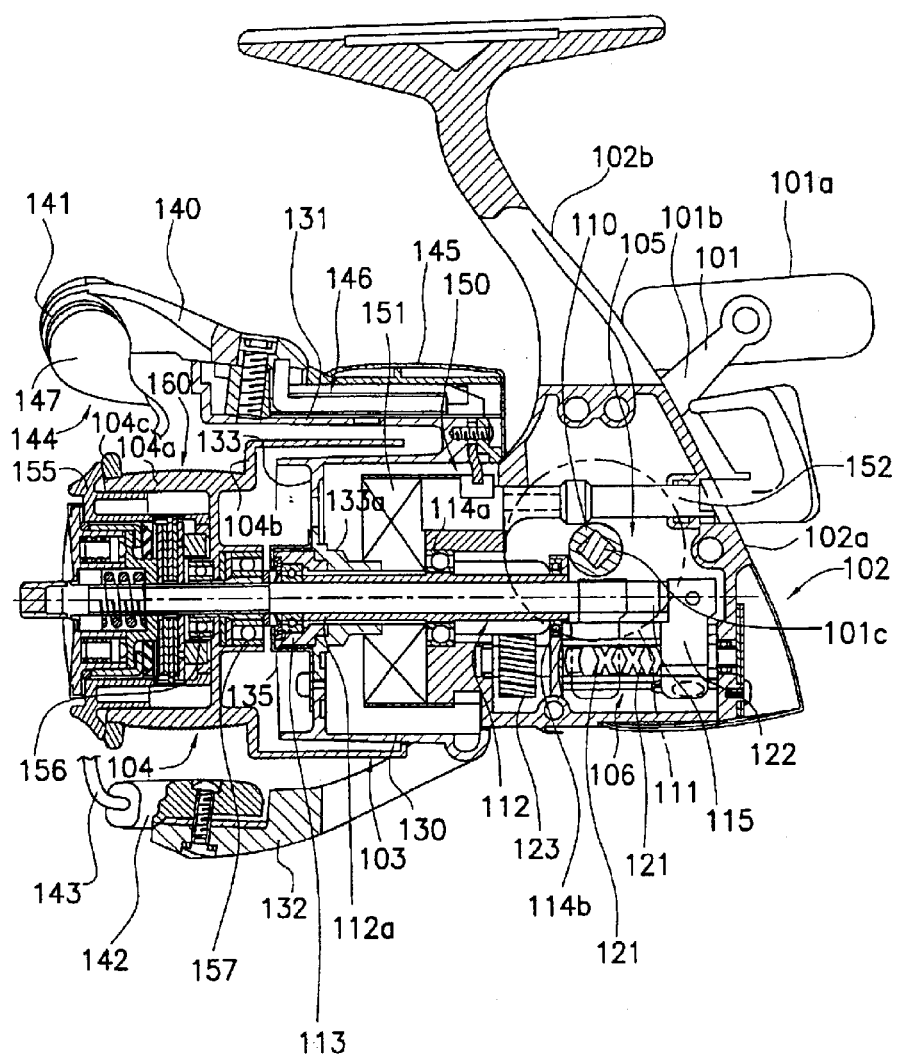
FIG. 9 is a partly in section view of the FIG. 8 reel.

The handle 101, as shown in Fig 8 and FIG. 9, includes: a T-shaped grip 101a; an L-shaped crank arm 101b, to the tip of which the grip 101a is rotatively fitted; and a shaft part 101c that is fitted to the base-end of the crank arm 101b. At the base end, the crank arm 101b is collapsible with a single touch. The shaft part 101c, as shown in FIG. 9, is a rod-shaped member rectangular in cross section. Now, the handle 101 is attachable to the reel unit 102 in either of left/right attachment locations: the right location shown in FIG. 8, or the left location shown in FIG. 10.

The reel unit 102 includes: a reel body 102a having a later opening 102c; a T-shaped rod-attachment leg 102b extending unitarily from the reel body 102a diagonally up/forward; and a lid body 102d for shutting the opening 102c in the reel body 102a.

The reel body 102a, as shown in FIG. 9, has an interior space; provided within the space are: a rotor driving mechanism 105 that is rotated in cooperation with rotation of the handle 101; and an oscillating mechanism 106 for winding fishing line uniformly onto the spool 104 by pumping it back and forth.

Figure 10:
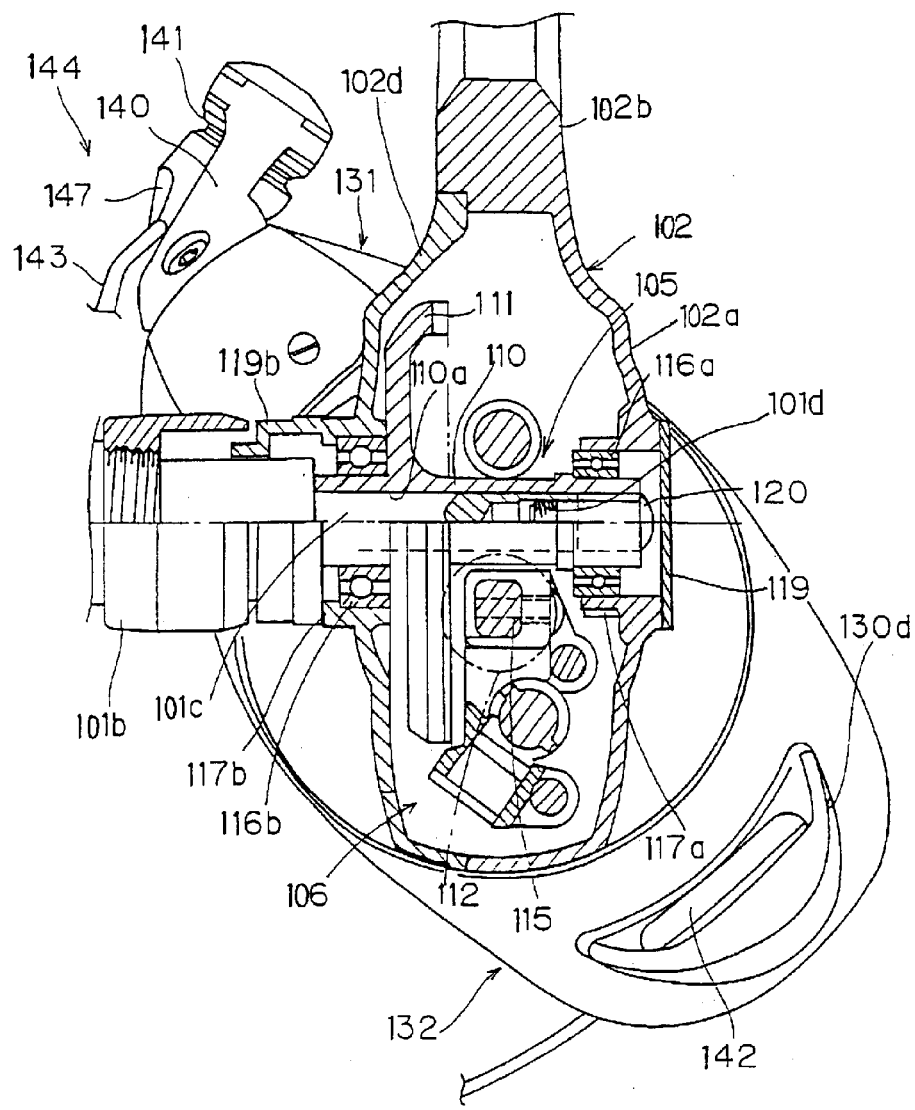
FIG. 10 is a section view taken along X—X in FIG. 8 and seen in the direction of the arrows, with the rod-mounting leg, bail and handle shaft fragmentary.

As shown in FIG. 10, a tubular boss 117a is formed on the FIG. -10 right side of the reel body 102a. The boss 117a is formed projecting inward of the reel body 102a in order to house a ball bearing 116a that carries a handle shaft 110 (later described) on its FIG. -10 right end. The boss on the side opposite the side on which the handle 101 is mounted (the boss 117a in FIG. 10), is closed off by a shaft cover 119. A bored cover 119b prevents water from invading a boss on the side into which the handle 101 is fitted (boss 117b in FIG. 10). The shaft cover 119, as shown in FIG. 8, and the bored cover 119b are elliptical components, and are attached to the bosses respectively by two screws 119a. The ball bearings 116a, 116b are, likewise as in the foregoing, highly corrosion resistant. Nevertheless, sealing members are not provided on the sides opposite the liquid-invasion sides (inward of the ball bearings). This is in order that the reel unit 102 interior, including the bearings 116a, 116b, may be washed with fresh water by opening the shaft cover 119 and the drilled cover 119b.

The fact that the ball bearings 116a, 116b are highly corrosion resistant means that though washed in this way, they are not liable to corrode.

The rotor driving mechanism 105 includes: the handle shaft 110, to which the handle 101 is non-rotatably fitted; a face gear 111 that rotates together with the handle shaft 110; and a pinion gear 112 that meshes with the face gear 111. Either end of the handle shaft 110 is rotatively supported in the reel body 102a via the ball bearings 116a, 116b. A through-hole 110a, rectangular in cross-section, is formed in the middle of the 20 handle shaft 110, and the shaft part 101c to the handle 101 is inserted non-rotatably into the through-hole 110a. A tapped hole 101d is formed in tip-end face of the shaft part 101c, and the handle 101 is attached to the handle shaft 110 by an installation screw 120 that screw-mates with the tapped hole 101d.

The pinion gear 112 is formed in a tubular shape, and as shown in FIG. 9 its front portion 112a penetrates the center of the rotor 103 and is onto which the rotor 103 is fastened by a nut 113. The pinion gear 112 is rotatively supported, at its mid-portion and rear-end portion axially, in the reel unit 102 via respective ball bearings 114a, 114b. The ball bearings 114a, 114b are, likewise as in the foregoing, highly corrosion resistant.

The oscillating mechanism 106 is a device for shifting in the front-to-rear direction a spool shaft 115 coupled via a drag mechanism 160 to the center of the spool 104, to shift the spool 104 in the same direction. The oscillating mechanism 106 includes: a worm shaft 121 disposed approximately directly beneath and parallel to the spool shaft 115; a slider 122 that shifts in the front-to-rear direction along the worm shaft; and an intermediate gear 123 fixed to the tip of the worm shaft 121. The rear end of the spool shaft 115 in non-rotatably fixed to the slider 122. The intermediate gear 123 meshes with pinion gear 112, such that rotation of the pinion gear 112 is transmitted to the worm shaft 121. In this embodiment, the handle shaft 110, the face gear 111, the worm shaft 121, the pinion gear 112, the rotor 103, and the spool 104 function as rotative components, while the spool shaft 115 functions as a stationary component.

The rotor 103, as shown in FIG. 9, has a round tube portion 130, and first and second rotor arms 131, 132 that are provided opposing each other sideways on the round tube portion 130. The round tube portion 130 and the two rotor arms 131, 132 are, e.g., manufactured from aluminum alloy and formed unitarily.

A front wall 133 is formed on the front of the round tub portion 130, and a boss 133a is formed in the middle of the front wall 133. A through-hole is formed in the center of the boss 133a, and the pinion-gear front portion 112a and the spool shaft 115 penetrate the through-hole. The nut 113 is disposed on the front wall 133, and a ball bearing 135 that rotatively carries the spool shaft 115 is disposed within the nut 113. The ball bearing 135 is, likewise as in the foregoing, highly corrosion resistant.

A first bail-support member 140 is pivotally fitted onto the outer peripheral side of the tip of the first rotor arm 131. The first bail-support member 140 is installed on the first rotor arm 131 by means of an installation pin screwed into the first rotor arm 131. A line roller 141 for guiding fishing line onto the spool 104, and a stationary-shaft cover 147 fixed astride the line roller 141 to the first bail-support member 140, are fitted to the tip of the first bail support member 140. The line roller 141 is rotatively fitted to the tip of the first bail-support member 140. The stationary-shaft cover 147 is shaped as a distorted cone with a sharp tip.

A bail 143 bent into roughly a U-shaped form from a wire element is fixed between the tip of the stationary-shaft cover 147 and the second bail arm 142. The first and second bail-support members 140, 142, the line roller 141, the bail 143, and the stationary-shaft cover 147 constitute a bail arm 144 that guides fishing line onto the spool 104. The bail arm 144 is pivotal between a line-guiding posture, shown in FIG. 9, and a reversed, line-releasing posture.

A cover 145 is fitted to the outer peripheral side of the first bail-support arm 140; and a bail-flipping mechanism 146 that returns the bail arm 144 from the line-releasing posture to the line-guiding posture in cooperation with rotation of the rotor 103, and at the same time retains the attitudes in either posture, is disposed in the cover 145 interior.

An anti-reverse mechanism 150 for prohibiting/allowing reversal of the rotor 103 is disposed in the interior of the round tub portion 130 of the rotor 103. The anti-reverse mechanism 150 includes a roller-type one-way clutch 151 whose inner race is free-rotating, and a switching device 152 that switches the one-way clutch 151 between an operational state (reverse-prohibited state) and an inoperative state (reverse-permitted state).

The spool 104 is disposed in between the first and second rotor arms 131, 132 on the rotor 103, and is fitted on the leading end of the spool shaft 115 via a drag mechanism 160. The spool 104 includes: a bobbin trunk 104a, outer circumferentially onto which fishing line is wound; a skirt 104, formed unitarily with the rear of the bobbin trunk 104a; and a flange plate 104, fixed to the front end of the bobbin trunk 104a. The outer circumferential face of the bobbin trunk 104a, a straight cylindrical component, is constructed to have a peripheral surface parallel to the spool shaft 115. The bobbin trunk 104a is rotatively fitted onto the spool shaft 115 on two bearings 156, 157. The ball bearing 156, 157 are, likewise as in the foregoing, highly corrosion resistant. The flange plate 104c is fixed to the bobbin trunk 104a by means of a spool ring collar 155 screwed fast to the inner circumferential surface of the bobbin trunk 104a.

Next, handling and operation of the spinning reel will be explained.

When casting, with the handle 101 being fitted in, e.g., the left position that FIG. 10 shows, the bail arm 144 is flipped into the line-releasing posture. The first bail-support member 140 and the second bail-support member 142 accordingly pivot.

In this situation, the fishing rod is cast with the index finger of the hand that grips the fishing rod hooking the fishing line. Doing so vigorously casts the fishing line out under the weight of the terminal tackle. At this point, rotating the handle 101 in the line-retrieving direction with, e.g., the left hand, via the rotor driving mechanism 105 rotates the rotor 103 in the line-retrieving direction, and via the bail-flipping mechanism 146 returns the bail arm 144 into the line-retrieving position, winding the fishing line onto the spool 104.

Rotating the handle 101 in the line-retrieving direction rotates, through the face gear 111 and the pinion gear 112, the rotor 103 in the line-retrieving direction, and winds the fishing line, guided by the bail arm 144, onto the spool 104. The fact that a seal is not provided on the handle shaft 110 means that rotational performance of the handle shaft 110 is not liable to deteriorate. Therefore, rotating the handle 101 lets the rotor 103 be rotated with light force.

When washing, the shaft cover 119 and the bored cover 119a are undone, and the handle 101 furthermore is undone. Then, through the center holes in the inner races of the bearings 116a, 116b, fresh water is introduced into the reel unit 102 interior to rinse it. Finally, the water is drained from the interior, which is further wiped out and then dried. Herein, the fact that the bearings are made highly resistant to corrosion means that though they are washed with fresh water, they are not apt to corrode.

Third Embodiment

Figure 11:
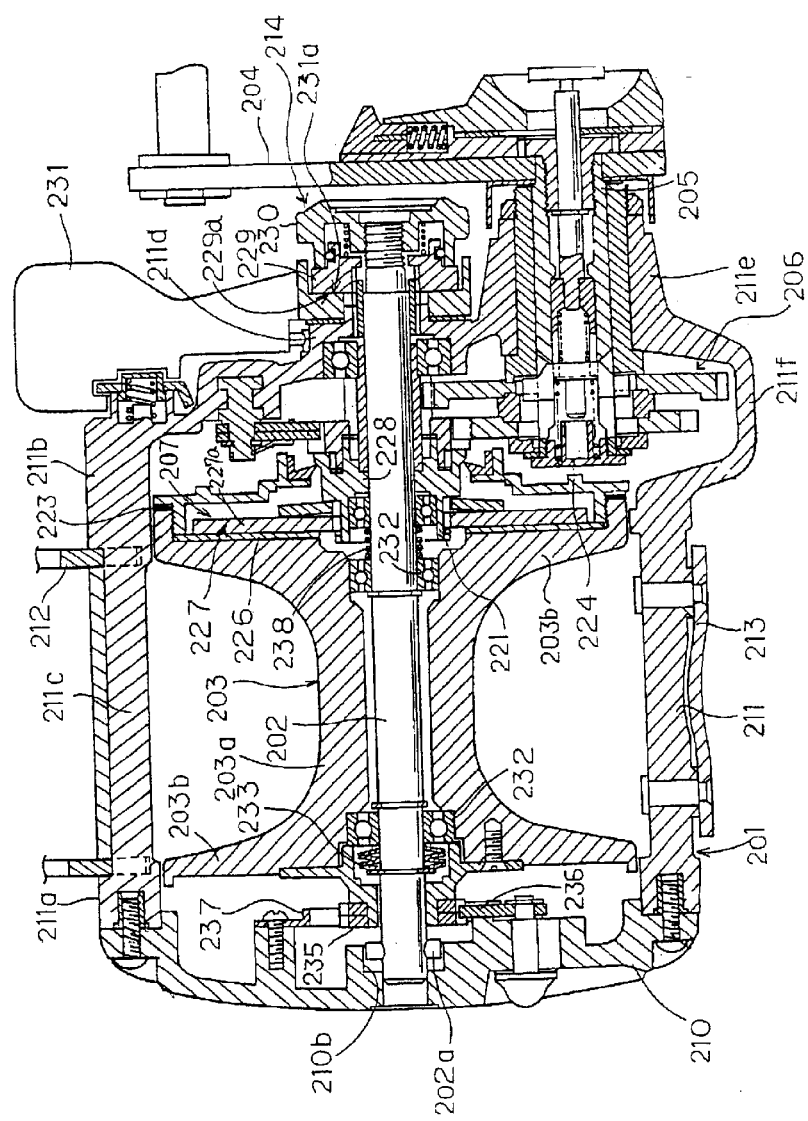
FIG. 11 is a horizontal section through a trolling reel in which a third embodiment of the present invention is adapted.

Set out in FIG. 11, a trolling reel into which a third embodiment of the present invention is adopted is composed of: a tubular reel unit 201; a spool shaft 202 fitted, non-rotatably but allowed axial travel, in the center of the reel unit 201; a spool 203 fixed, free to rotate but axially immobilized, on the spool shaft 202; and a handle 204 disposed sideways on the reel unit 201. In the interior of the reel unit 201, the trolling reel is further furnished with a gear change-speed mechanism 206 that transmits handle 204 rotation to the spool 203, and a drag mechanism 207 that brakes the spool 203. In this embodiment, the reel unit 201 and the spool shaft 202 function as the stationary components, while the spool 203, the handle 204, and the drag mechanism 207 function as rotative components.

The reel unit 201 has a disk-shaped side plate 210, and a reel body 211, onto which the side plate 210 is coupled coaxially through a faucet joint, and fixed by screws. The spool shaft 202 is supported endwise, to be non-rotatable yet axially movable, by the side plate 210 in about the center thereof. In a hole in the center, an interlock groove 210b is formed, into which an interlocking pin 202a, which is formed jutting outward on the one end of the spool shaft 202, interlocks. The spool shaft 202 is made non-rotatable with respect to the reel unit 201 by the engagement of the interlocking pin 202a and the interlock groove 210b.

The reel body 211 is a closed-ended cylindrical component formed in one piece from synthetic resin or die-cast aluminum. The reel body 211 includes: a ring-shaped fastening portion 211a, to which the side plate 210 is fixed; a disk-shaped support portion 211b, disposed opposing and parted at a spacing from the fastening portion 211a, for supporting a handle shaft 205; and connecting portions 211c that link the fastening portion 211a and the support portion 211b in four places circumferentially. The support portion 211b has: a first boss 211d that supports, axially movably, the other end of the spool shaft 202, in the mid-portion thereof; and a second boss 211e that is provided below the first boss 211d and rotatively supports the handle 205. Further, a bulged portion 211f, bulging diametrically in order to house the gear mechanism 206, is formed in the lower part of the support portion 211b.

Harness lugs 212 for attaching a reel harness are mounted spaced-apart on the upper of the connecting portions 211c, and on the lower thereof a rod attachment part 213, for mounting the reel onto a fishing rod, is provided.

The spool shaft 202 rotatively carries the spool 203 via two ball bearings 232 disposed at an axial spacing. The ball bearings 232 have, likewise as in the foregoing, high corrosion resistance. Belleville washers 233 abut on the left side of the ball bearing 232 at the left end of the spool shaft 232. Further, a coil spring 238, which urges the spool shaft 202 contrariwise to the handle 204, abuts on the right side of the right-end ball bearing 232.

The spool 203 includes a trunk 203, and a pair of flanges 203b formed integrally with the trunk 203a at either end. A sounding sprocket 235 is provided on the end face of the flange 203b on the left side. An engagement pawl 236, supported on a C-shaped spring element 237 installed on the side plate 210, engages with the sounding sprocket 235, and thereby a clicking sound is produced when the spool 203 rotates.

A friction plate 226 that is a component of the drag mechanism 207 is non-counter-rotatably fixed to the end face of the flange 203b on the right side of the spool 203.

The handle 204 is fixed to the protruding end of the tubular handle shaft 205 disposed below the spool shaft 202, and parallel with the spool shaft 202. The handle shaft 205 is rotatively supported in the reel body 211 by the second boss 211e.

The gear change-speed mechanism 206, gearing up/down between either of two speeds, transmits rotation of the handle shaft 205 to the drag mechanism 207.

The drag mechanism 207 includes: the just-noted friction plate 226; a drag disk 227 that compressively contacts the friction plate 226; and a drag operating mechanism 214 that axially shifts the spool shaft 202 together with the spool 203.

The drag disk is furnished with a disk body 227a for compressively contacting the friction plate 226, and a transmission member 228 fitted non-rotatably into the inner rim of the disk body 227a. The transmission member 228 is coupled to, and rotates together with, the gear mechanism 206. The drag cover 224 covers by the drag disk 227. The inner peripheral margin of the drag cover 224 is disposed about the outer periphery of the transmission member 228; and the outer peripheral margin screws into, the flange 203b on the right side of the spool 202, where it is fastened with a packing 223 intervening. A ball bearing 221 on the spool shaft 202 rotatively carries the transmission member 228. The ball bearing 221 is, likewise as in the foregoing, highly corrosion resistant.

The drag operating mechanism 214 includes: a rotary knob 230, retained on the end of the spool shaft 202 on the handle 204 side by a stop-screw; a cam body 229 that abuts on the rotary knob 230; and a drag lever 231 disposed in between the cam body 229 and the end face of the first boss 211d on the reel body 211. The cam body 229 is disposed coaxial with the spool shaft 202, and a cam face 229a on which the drag lever 231 rides is formed on the side opposite its face abutting on the rotary knob 230. The drag lever is pivotally supported in the first boss 211d, and the surface that rides on the cam face 229a forms a cam face 231a. These cam faces 229a, 231a form an inline type configuration; and pivoting the drag lever 231 slides the spool shaft 202 axially with respect to the reel unit 201.

Next, a method of operating the trolling reel described above will be explained.

In regulating the friction force from the drag mechanism 207, the axial position of the spool shaft 202 is set into an appropriate position by means of the rotary knob 230. If by working the drag lever 231 the spool shaft 202 is shifted, for example, toward the handle 204, the friction force will be increased as a result of the spool 203 shifting toward the drag disk 227. Conversely, if the spool shaft 202 is shifted opposite the handle 204, the friction force will be decreased as a result of the spool 203 shifting in the direction parting from the drag disk 227. When the friction plate 226 on the spool 203 is then completely parted from the drag disk 227, the spool 203 is permitted to reverse.

Herein, the fact that the ball bearings are made to have high resistance to corrosion sustains their rotational performance and improves their corrosion resistance.

Fourth Embodiment

Figure 12:
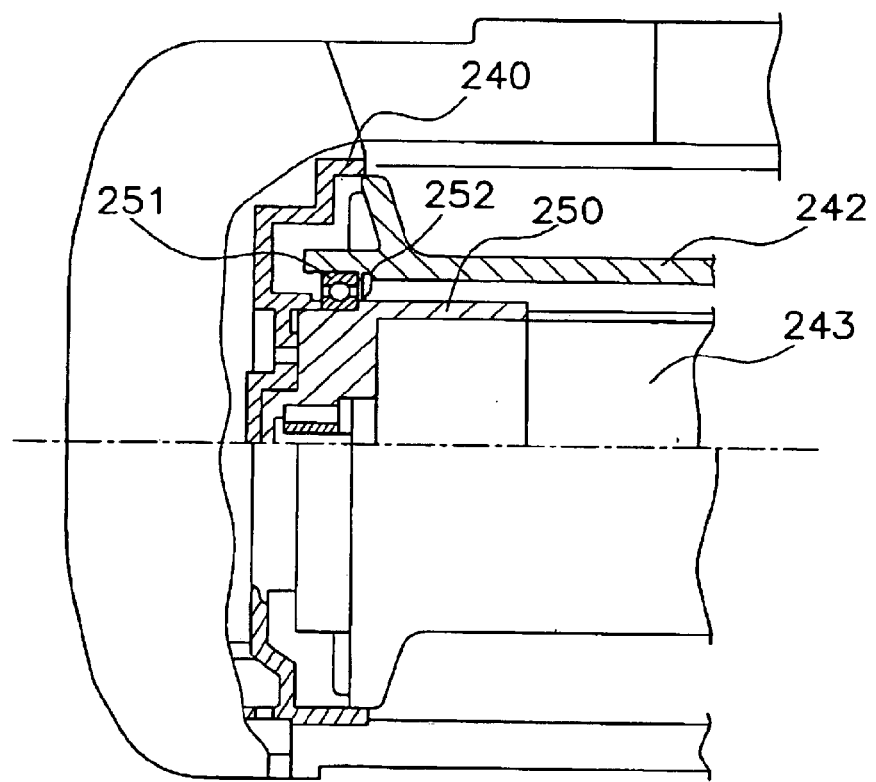
FIG. 12 is a cut-away, partly in section view of a motor-mounting area in an electric reel in which a fourth embodiment of the present invention is adapted.

Set out in FIG. 12, an electric reel motor 243 into which a fourth embodiment of the present invention is adopted is fitted at the end opposite the output shaft into a reel body 240 with a motor case 250 intervening. The motor case 250 is disposed in the interior of a spool 242. A ball bearing 251 is disposed in between the motor case 250 and the spool 242. A sealing member 252 is fitted on the side of the bearing 251 opposite (FIG. -12 right side) the side through which liquids invade. The sealing member 252 is configured likewise as those fitted to the worm shaft 26 in Embodiment 1.

In this way, sealing the bearing that supports the electric reel motor, with the sealing member 252 fitted on the side thereof that is opposite the side through which liquids invade, makes the bearing washable, while preventing damage to the motor.

Other Embodiments (a) In the foregoing embodiments, examples in a bait reel, a front-drag type spinning reel, a lever-drag type dual-bearing reel, and an electric reel were illustrated, but the present invention is not limited to these reels, and may be applied to all fishing reels, such as other models of spinning reels including lever-brake spinning reels, other dual-bearing reels including dual-bearing reels that come with counters, and single-bearing (cantilevered) reels. Reels used in ocean fishing are especially appropriate.

(b) In the foregoing embodiments, the ball bearing outer races, inner races, and rolling bodies are constituted by SUS 440C on which a highly corrosion resistant coating film is formed, which lends high corrosion resistance to the bearings overall, but at least the rolling bodies alone may be made highly corrosion resistant. Further, in addition to the rolling bodies, only that outer race or inner race that is the rotational side may be made highly corrosion resistant. Further still, the retainers may be made corrosion resistant.

(c) In the foregoing embodiments, the highly corrosion resistant coating film is produced, but the parent material itself may be made highly corrosion resistant without production of the highly corrosion resistant coating film. For example, the parent material may be manufactured from ceramics having high corrosion resistance, such as alumina ceramics and SiC ceramics; or manufactured from stainless steels having high corrosion resistance, such as SUS 304, 316 or 630; or manufactured from metals having high corrosion resistance, such as titanium and boron.

(d) In the foregoing embodiments, examples with ball bearings as the antifriction bearings were illustrated, but the present invention may be applied to parallel roller bearings, needle bearings, and other models of antifriction bearings for is all types of fishing reels. It is further applicable to roller-type one-way clutches that serve also as antifriction bearings.

INDUSTRIAL APPLICABILITY

Under the invention mainly, the fact that at least the rolling bodies are manufactured with a highly corrosion resistant ingredient or else are metal manufactures coated with a highly corrosion resistant coating film means that the anti-corrosiveness of the rolling bodies—ever-rolling during rotation—is heightened. The corrosion resistance of the bearing overall is therefore improved. Further, because the corrosion resistance is improved, there is no need to provide sealing members for preventing corrosion. Eliminating need for a load-imposing seal while nonetheless improving anti-corrosiveness curtails deterioration in bearing rotational performance.

Under the invention otherwise, the bearings are not apt to corrode, despite sea water invading; meanwhile, rinse water or the like can permeate the bearings, which facilitates washing sea-water soiled bearings. Moreover, because the sealing members are fitted on the inward side of the bearings, liquids will not invade deeper than that, which prevents corrosion of the interior components.

What is claimed is:

1. A fishing-reel bearing for use in a fishing reel provided between a first component and a second component that is disposed to a circumferentially inner side of the first component and is rotatable relative to the first component in response to rotation of a handle of the fishing reel, the fishing-reel bearing comprising:

an outer race fitted to the first component;
    an inner race fitted to the second component and is disposed spaced apart from the outer race; and
    a plurality of rolling bodies disposed circumferentially between the outer and inner races so as to contact both the outer and inner races,
    at least the rolling bodies being stainless alloy manufactures coated with a highly corrosion resistant film that is formed by refining a surface of the stainless alloy.

2. A fishing-reel bearing as set forth in claim 1, further comprising
    a retainer for retaining the rolling bodies circumferentially spaced such that the rolling bodies can roll, said retainer having a surface that is highly corrosion-resistant.

3. A fishing-reel bearing as set forth in claim 2, wherein the retainer is manufactured of a metal material and coated with a highly corrosion-resistant coating film.

4. A fishing-reel bearing as set forth in claim 1, wherein at least the rolling bodies are SUS 440C (JIS) manufactures having low corrosion-resistance ingredients.

5. A fishing-reel bearing as set forth in claim 1, wherein the highly corrosion resistant film is made of chromium oxide.

6. A fishing-reel bearing as set forth in claim 1, wherein the outer race and inner race have surfaces that are highly corrosion-resistant.

7. A fishing-reel bearing as set forth in claim 1, further comprising
    a sealing member disposed on a side of the bearing closer to the handle, the sealing member being for sealing a gap between the outer and inner races.

8. A fishing reel, comprising
    a handle;
    a stationary component;
    a rotative component disposed opposite the stationary component so as to be rotatable relative to the stationary component, the rotative component being rotatable in response to rotation of the handle; and
    a bearing disposed between the stationary component and the rotative component, the bearing including
        an outer race fitted to one of the stationary and rotative components,
        an inner race fitted to the other of the stationary and rotataive components and disposed spaced apart from the outer race, and
        a plurality of rolling bodies disposed circumferentially between the outer and inner races so as to contact both the outer and inner races,
        at least the rolling bodies being stainless alloy manufactures coated with a highly corrosion resistant film that is formed by refining a surface of the stainless alloy.

9. A fishing reel as set forth in claim 8, further comprising
    a sealing member disposed on a side of the bearing closer to the handle, the sealing member being for sealing a gap between the outer and inner races.

10. A fishing reel as set forth in claim 9, wherein the sealing member seals a gap between the stationary and rotative components.

11. A fishing reel as set forth in claim 8, further comprising
    a retainer for retaining the rolling bodies circumferentially spaced such that the rolling bodies can roll, said retainer having a surface that is highly corrosion-resistant.

12. A fishing-reel as set forth in claim 11, wherein the retainer is manufactured of a metal material and coated with a highly corrosion-resistant coating film.

13. A fishing-reel as set forth in claim 8, wherein at least the rolling bodies are SUS 440C (JIS) manufactures having low corrosion-resistance ingredients.

14. A fishing-reel as set forth in claim 8, wherein the highly corrosion-resistant film is made of chromium oxide.

15. A fishing-reel as set forth in claim 8, wherein the stationary component includes a reel body to which the handle is disposed sideways, and a spool shaft, and
    the rotative component includes a line-winding spool fitted rotatably and detachably/reattachably to the reel body so as to be rotatable about the spool shaft, a worm gear rotatably supported within the reel body, and a gear train that transmits torque from the handle to the spool and the worm gear.

16. A fishing-reel as set forth in claim 15, wherein
the outer race is fitted to the reel body, and
the inner race is fitted to the gear train.
17. A fishing-reel as set forth in claim 15, wherein
the outer race is fitted to the spool, and
the inner race is fitted to the spool shaft.
18. A fishing-reel as set forth in claim 15, wherein
the spool is rotated by an electric reel motor.
19. A fishing-reel as set forth in claim 8, wherein
the stationary component includes a reel unit rotatively carrying the handle and a spool shaft, and
the rotative component includes a handle shaft to which the handle is non-rotatably fitted, a face gear that rotates together with the handle shaft, a pinion gear that meshes with the face gear, a worm shaft to which rotation of the handle is transmitted, a rotor rotatively supported on a front of the reel unit, and a spool, onto a circumferential surface of which fishing line is retrieved, the spool being disposed on a front of the rotor such that the spool shaft shifts the spool front and rear.
20. A fishing-reel as set forth in claim 19, wherein
the outer race is fitted to the spool, and
the inner race is fitted to the spool shaft.
21. A fishing-reel as set forth in claim 19, wherein
the outer race is fitted to the reel body, and
the inner race is fitted to the pinion gear.

\* \* \* \* \*